United States Patent
Kimura et al.

(10) Patent No.: US 6,332,447 B1
(45) Date of Patent: Dec. 25, 2001

(54) DIESEL ENGINE

(75) Inventors: Shuji Kimura, Yokohama; Osamu Aoki, Tokyo, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/591,425

(22) Filed: Jun. 9, 2000

(30) Foreign Application Priority Data

Jun. 10, 1999 (JP) .................................. 11-163659

(51) Int. Cl.$^7$ ....................................... F02B 3/10
(52) U.S. Cl. ................................. 123/299; 123/339.25
(58) Field of Search ................. 123/299, 339.25, 123/339.29

(56) References Cited

U.S. PATENT DOCUMENTS

| | | | |
|---|---|---|---|
| 5,492,098 | * | 2/1996 | Hafner et al. ............... 123/299 |
| 6,032,642 | * | 3/2000 | Trumbower et al. .......... 123/299 |
| 6,067,489 | * | 5/2000 | Letang et al. ............... 123/299 |
| 6,161,519 | * | 12/2000 | Kimura et al. .............. 123/299 |
| 6,240,896 | * | 6/2001 | Ueda et al. ................. 123/299 |

FOREIGN PATENT DOCUMENTS 56-101031  8/1981 (JP) .
7-4287  1/1995 (JP) .

OTHER PUBLICATIONS

Nakada T., "Recent trend in noise and vibration reduction technologies and diesel engines", Isuzu Technical Papers, vol. 99, pp. 85–91, 1998.

* cited by examiner

Primary Examiner—Erick Solis
(74) Attorney, Agent, or Firm—Foley & Lardner

(57) ABSTRACT

A dish-shaped combustion chamber (14) is formed in a diesel engine piston (13), and a fuel injector (16) is installed on the center axis of this combustion chamber (14). A device (3,41) is provided for varying the intake air amount aspirated into the engine. It is determined whether the engine is an idle running state or a normal running state. The device (3,41) is controlled so that the intake air amount in the idle running state is less than the intake air amount in the normal running state, and the injector (16) is controlled so that part of the fuel is injected before a main injection when the engine is in the idle running state.

6 Claims, 11 Drawing Sheets

DIESEL ENGINE

FIELD OF THE INVENTION

This invention relates to a diesel engine which reduces noise and vibration, and especially during idle running of an engine.

BACKGROUND OF THE INVENTION

In a conventional diesel engine, the maximum internal cylinder pressure (i.e., the maximum generated pressure in a cylinder) is at a very high level, the maximum internal cylinder pressure, particularly in the idle state, is far higher than in a gasoline engine with a throttle in an intake system ("Isuzu Technical Papers", Vol. 99, p. 85).

As a result, for the same difference of engine torque fluctuation and vibration, the noise and vibration of a diesel engine are very marked in comparison to a gasoline engine in the idle state.

A technique for reducing noise in the idle running state of a diesel engine is disclosed in Japanese Patent Publication Tokkai Sho 56-101031. In this invention, a shutter is provided in an intake air passage of the engine, this shutter being closed in the idle running state. This reduces the intake air amount and decreases the pressure in the compression stroke. By decreasing the compression pressure, the maximum pressure generated when fuel is burnt also decreases, so noise in the idle running state is therefore mitigated.

SUMMARY OF THE INVENTION

This noise reduction effect increases the more the intake air amount is reduced. However, if the intake air amount is reduced, the gas temperature in the cylinder compressed in the compression stroke also falls, so the ignitability of the fuel injected near the end of the compression stroke is impaired and the combustion stability is thereafter adversely affected.

It is therefore an object of the present invention to resolve the above problem by reducing noise and vibration without impairing combustion in the idle running state.

In order to achieve the above object, the present invention provides a diesel engine which comprises a piston having a dish-shaped combustion chamber is formed on its top surface, a fuel injector situated coaxially with the combustion chamber which injects fuel directly into a cylinder, an intake air amount control device which varies an intake air amount aspirated by the engine, and a detector which detects a running state of the engine. The diesel engine further comprises a mechanism for determining whether or not the engine is an idle running state or a normal running state, a mechanism for controlling the intake air amount controller based on the engine running state so that the intake air amount in the idle running state is less than the intake air amount in the normal running state, and a mechanism for controlling the fuel injector so that part of the fuel is injected before a main injection when the engine is in the idle running state.

The details as well as other features and advantages of the present invention are set forth in the remainder of the specification and are shown in the accompanying drawings.

DESCRIPTION OF THE PREFERRED EMBODIMENTS

Figure 1:
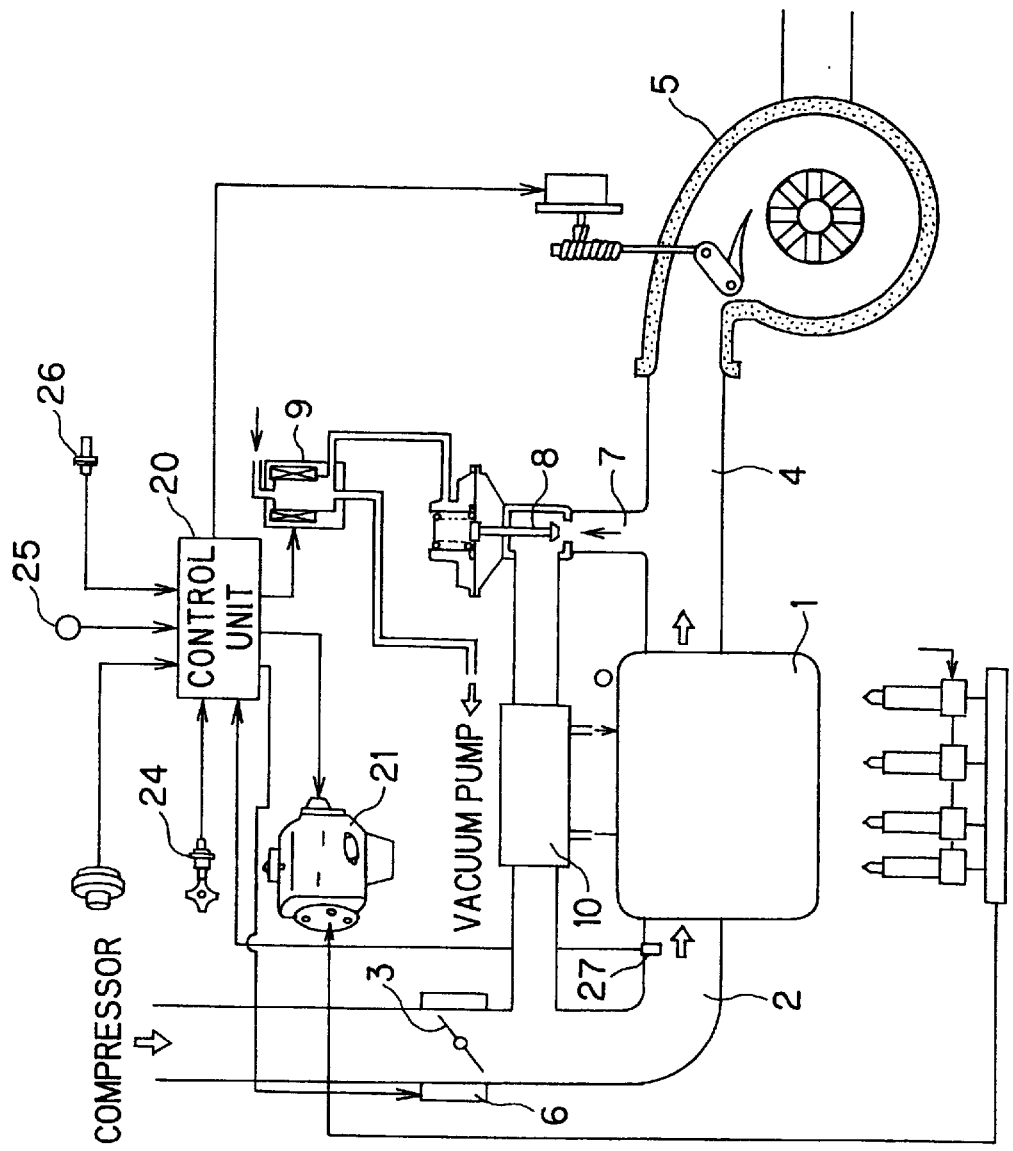
FIG. 1 is a schematic block diagram showing an embodiment of this invention.

FIG. 1 is a schematic diagram of a diesel engine to which this invention is applied.

A throttle valve 3 is provided in an intake air passage 2 connected to an engine body 1. The throttle valve 3 is driven by an actuator 6 so that its opening varies, and the air amount aspirated by the engine is thereby regulated.

The actuator 6 varies the opening of the throttle valve 3 according to a control signal from a controller 20.

The engine comprises a turbocharger, and due to the rotation force of an exhaust gas turbine 5 disposed in an exhaust gas passage 4, a compressor, not shown, is rotation driven to supercharge the air delivered to the intake air passage 2.

An exhaust gas recirculation passage 7 connects the intake air passage 2 with the exhaust gas passage 4, part of the exhaust gas passing through this exhaust gas recirculation passage being recirculated to the intake air passage 2. A control valve 8 which regulates the amount of recirculated exhaust gas according to running conditions is disposed in the exhaust gas recirculation passage 7.

The valve opening of the control valve 8 varies according to a negative pressure supplied by a negative pressure regulating valve 9. The negative pressure regulating valve 9 operates according to a negative pressure control signal from the controller 20, regulates the negative pressure from a vacuum pump, not shown, and supplies this regulated negative pressure to the control valve 8.

A cooler 10 is disposed downstream of the control valve 8. This cooler 10 uses the cooling water for cooling the engine body 1 to cool the exhaust gas flowing through the exhaust gas recirculation passage 7.

Signals detected by an engine rotation speed sensor 24, accelerator opening sensor 25, cooling water temperature sensor 26 and intake air temperature sensor 27, i.e., signals representing engine running conditions, are input to the controller 20.

Figure 2:
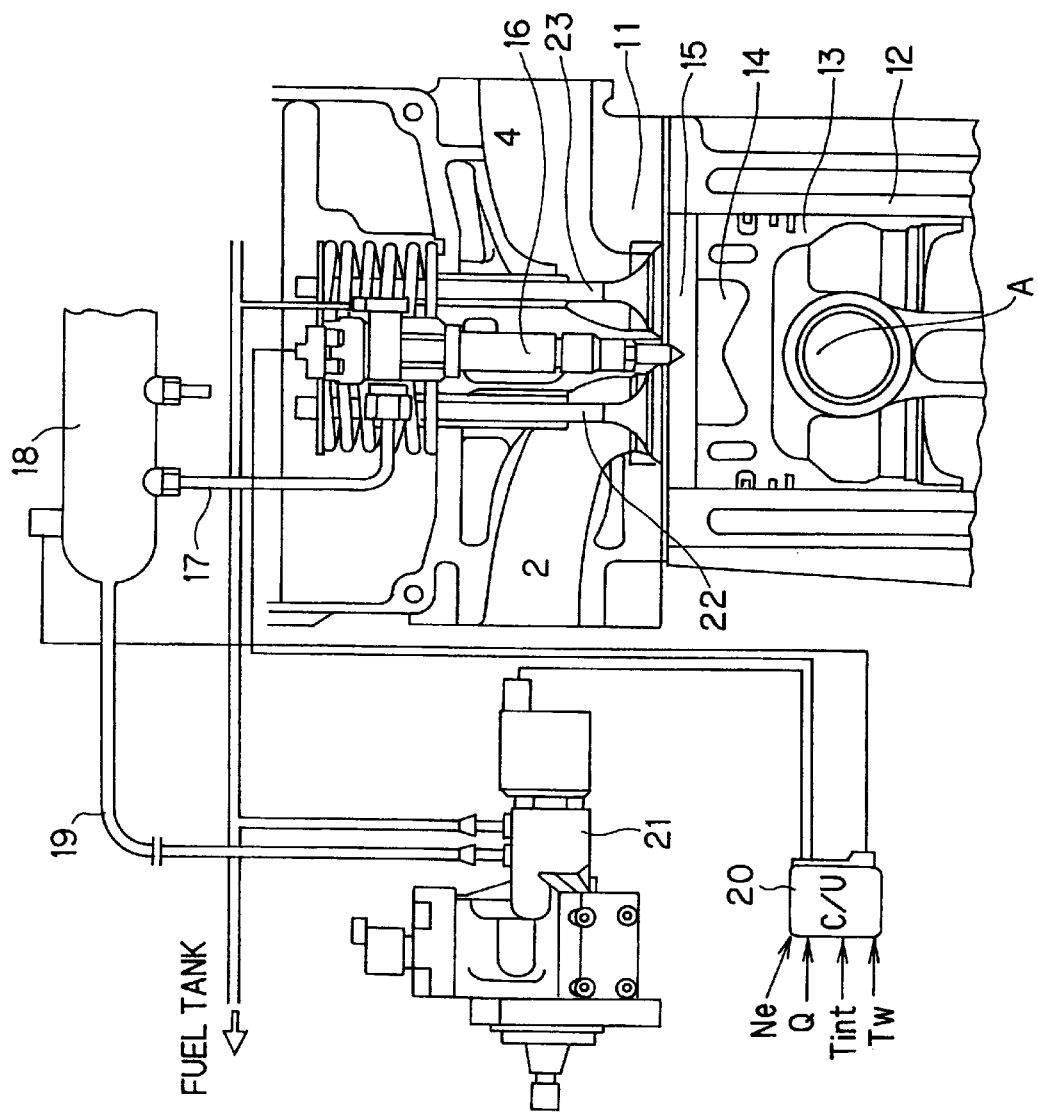
FIG. 2 is a cross-sectional view of an engine according to this embodiment.

FIG. 2 is a detailed drawing of the engine body 1.

An injector 16 for injecting fuel into a cylinder 12 is installed in a cylinder head 11. A combustion chamber 14 of which the shape will be described in detail later, is formed on the top surface of a piston 13 which moves back and forth in the cylinder 12.

The injector 16 is disposed effectively immediately above a center axis A of the combustion chamber 14, and high-pressure fuel is supplied by the injector 16 via a high-pressure pipe 17 connected to each cylinder. The injector 16 comprises a built-in solenoid valve, this solenoid valve is operating in response to a fuel injection signal from the controller 20 to inject fuel.

The injection timing and injection amount of the fuel injected by the injector 16 can be freely controlled by varying the fuel injection signal from the controller 20.

The injector 16 is so designed that the fuel injection rate (fuel injection amount per unit time) is larger than in an ordinary injector and the fuel injection period in the normal running state is as short as possible.

The high pressure pipe 17 provided to each cylinder is connected to a common rail 18 which has a fixed capacity and is common to all cylinders.

High-pressure fuel is supplied from a fuel pump 21 to the common rail 18 via a high pressure pipe 19. The discharge pressure of the fuel pump 21 is controlled by the controller 20, and the fuel pressure in the common rail 18 coincides with a target pressure determined according to the running conditions.

An intake air valve 22 is opened and closed by a cam, not shown, in synchronism with the engine rotation, and connects or disconnects the intake air passage 2 with a combustion space 15 in the cylinder.

Likewise, an exhaust gas valve 23 is opened and closed in synchronism with the engine rotation, and connects or disconnects the exhaust gas passage 4 with the combustion space 15 in the cylinder.

The compression ratio of this engine is set to 14. In other words, this is a very low compression ratio for a diesel engine.

Figure 3:
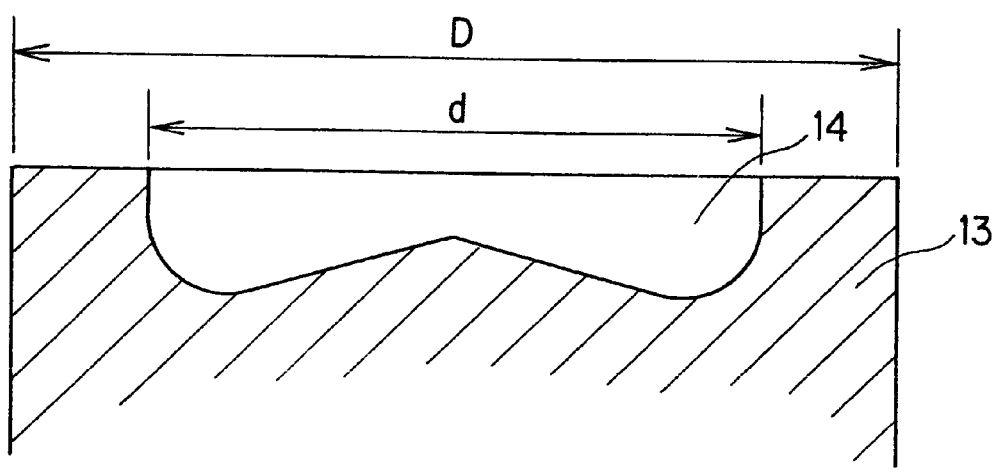
FIG. 3 is a cross-sectional view of a piston according to this embodiment.

FIG. 3 is a detailed drawing of the piston 13.

The combustion chamber 14 is formed a dish-shaped recess. The inner diameter of the combustion chamber 14 is a maximum at the inlet, the inner diameter being no greater at any point from the inlet towards the bottom. The combustion chamber 14 is situated so that its center is effectively coaxial with the piston.

Figure 11:
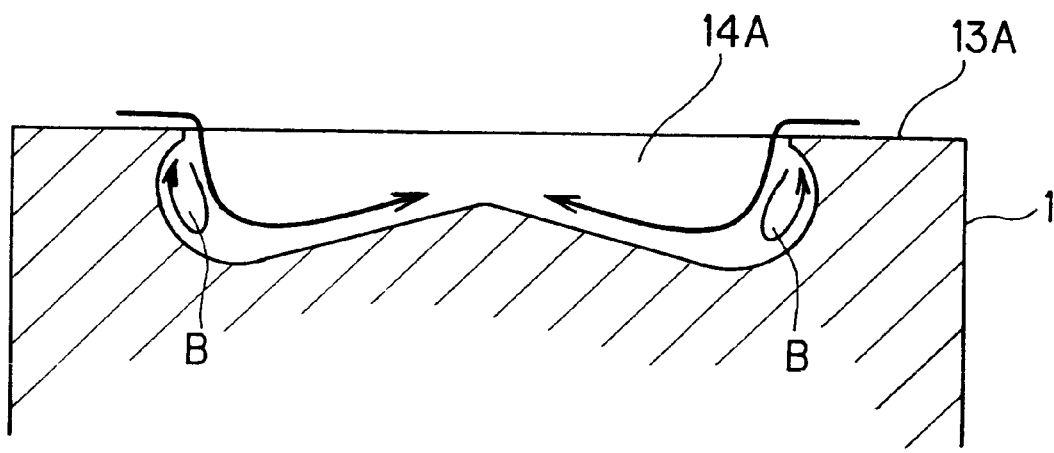
FIG. 11 is a cross-sectional view of a piston for purposes of comparison with the present invention.

For the purpose of comparison with the piston of this embodiment, FIG. 11 shows a combustion chamber having a shape wherein the inner diameter is greater towards the bottom than at the inlet. In a combustion chamber which has a narrow part near the inlet, a turbulence (B) is produced in the flow near the inner wall of a combustion chamber 14A by air flowing towards the combustion chamber 14A from the space above a piston 13A in the compression stroke. If this turbulence (of flow) is produced, more fuel adheres to the inner wall, and has an adverse effect on combustion.

However, in the combustion chamber which does not have a narrow part in the inlet according to this embodiment shown in FIG. 3, such turbulence is not easily produced.

An inner diameter (d) of the inlet of the combustion chamber 14 has a size equal to or greater than 50% of an outer diameter (D) of the piston 13, i.e., d>0.5×D.

Figure 4:
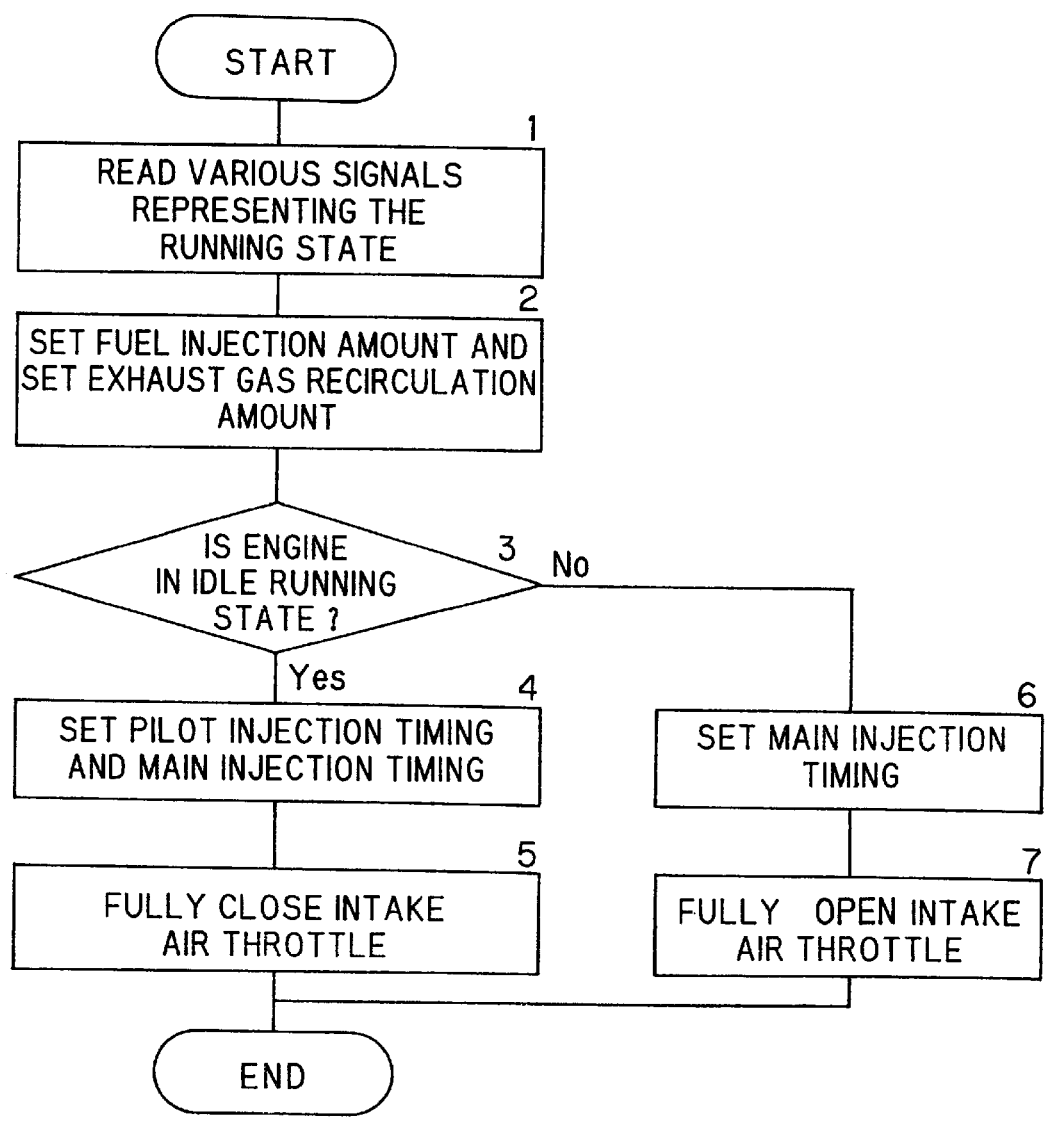
FIG. 4 is a flowchart showing the control performed according to this embodiment.

FIG. 4 is a flowchart showing the details of the processing performed by a microprocessor in the controller 20. This processing is repeated at a predetermined interval.

In a step 1, output signals are read from the engine rotation speed sensor 24, accelerator opening sensor 25, cooling water temperature sensor 26 and intake air temperature sensor 27.

In a step 2, the fuel injection amount and exhaust gas recirculation amount are set corresponding to running conditions at that time based on the signals read in the step 1. In a step 3, it is determined whether or not the engine is in an idle running state based on the running conditions signals read in the step 1. For example, if the output signal from the accelerator opening sensor 25 is a value showing the accelerator is fully closed and the output signal of the engine rotation speed sensor 24 is a value equal to or less than a predetermined rotation speed, it is determined that the engine is in the idle running state, and in other cases it is determined that the engine is in the normal running state.

If it is determined in the step 3 that the engine is in the idle running state, the routine proceeds to a step 4, and a pilot injection timing and main injection timing are set to perform two fuel injections.

According to this embodiment, the pilot injection timing is set in the vicinity of 30 degrees before compression top dead center, and the main injection timing is set in the vicinity of 10 degrees before compression top dead center.

In a next step 5, the opening of the throttle valve 3 is set to almost fully closed so as to reduce the intake air amount.

On the other hand, when it is determined in the aforesaid step 3 that the engine is in the normal running state, the routine proceeds to a step 6, and only the main injection timing is set to perform one fuel injection. According to this embodiment, this fuel injection timing is set to a timing which is delayed after compression top dead center.

In a next step 7, the opening of the throttle valve 3 is set to fully open.

The controller 20 sends a negative pressure control signal corresponding to an exhaust gas recirculation amount set in the step 2 to the negative pressure regulating valve 9. A control signal corresponding to the opening of the throttle valve 3 set in the step 5 or the step 7 is also sent to the actuator 6.

When the step 4 is performed and both the pilot injection timing and main injection timing are set, the fuel injection amount set in the step 2 is divided into a pilot injection amount and a main injection amount. When the pilot injection timing is reached, a fuel injection signal corresponding to the pilot injection amount is sent to the injector 16, and when the main injection timing is reached, a fuel injection signal corresponding to the main injection amount is sent to the injector 16.

When the step 6 is performed and only the main injection timing is set, and the main injection timing is reached, a fuel injection signal corresponding to the fuel injection amount set in the step 2 is sent to the injector 16.

Next, the action of this embodiment will be described.

The lower the intake air amount, the more the compression pressure falls and the maximum combustion pressure decreases, and the noise produced in the idle running state is thereby reduced. However, the ignitability of the injected fuel and the combustion stability are more adversely affected the lower the intake air amount.

According to this embodiment, this adverse effect on combustion is resolved by performing two fuel injections, i.e., by performing a pilot injection before the main injection, when the opening of the throttle valve 3 is reduced to decrease the intake air amount. The fuel injected in the pilot injection is ignited first, and the fuel injected in the following main injection therefore burns stably.

In this way, the noise of the diesel engine is reduced, while good ignition characteristics and combustion stability are obtained at the same time.

Decrease of cylinder gas temperature accompanying the reduction of intake air amount delays vaporization of fuel adhering to the piston 13, and is also factor in increasing the amount of unburnt HC produced.

However, according to this embodiment, increase in the amount of unburnt HC is avoided by suitably designing the shape of the combustion chamber 14.

Specifically, the distance from the injector 16 situated immediately above the combustion chamber 14 to the inner wall of the combustion chamber 14 is made longer by arranging that the inner diameter d of the combustion chamber 14 is equal to at least 50 percent of the outer diameter of the piston 13. The fuel injected from the injector 16 therefore forms a mist which expands conically around the nozzle of the injector 16 as center.

As the distance from the injector 16 to the inner wall is long, the fuel injected from the injector 16 is atomized before it reaches the inner wall, and the amount of fuel adhering to the inner wall decreases. This has the effect of suppressing generation of unburnt HC.

Further, as there is no narrow part in the inlet to the combustion chamber 14, there is less turbulence in the gas flow near the inner wall when air is pushed into the interior of the combustion chamber 14 in the compression stroke. Therefore, the amount of fuel drawn in by turbulence which would adhere to the inner wall is reduced.

The injection of fuel in two stages, i.e. the pilot injection and the main injection, is effective in improving ignitability and combustion stability by distributing more fuel near the center of the combustion chamber 14, and as the amount of fuel in one injection is also reduced, less fuel reaches the inner wall of the combustion chamber 14 which also contributes to suppressing the generation of unburnt HC.

In running states other than the idle running state, it is important to burn fuel producing as little smoke as possible. In diffusion combustion which is the usual form of combustion in a diesel engine, the amount of smoke generated is less the higher the diffusion speed of the fuel. The fuel diffusion speed increases the higher the gas flowrate in the combustion chamber.

However, as the combustion chamber has a shape designed to reduce gas flow turbulence inside the combustion chamber 14, it is impossible to increase the fuel diffusion speed by a large amount.

Therefore according to this embodiment, the fuel is burnt by premixed combustion, which is a form of combustion wherein smoke is not easily generated even if the gas flow is weak.

Specifically, the fuel injection timing is delayed after compression top dead center, so the fuel ignition delay period (time from when fuel injection starts to when combustion of the injected fuel starts) is largely prolonged. It is possible to inject the entire fuel amount during this ignition delay period, thus the entire injected fuel amount forms a combustible mixture by mixing with air during the interval before ignition, and then self-ignites and burns by flame propagation.

By making the combustion mainly premixed combustion, the smoke generation amount can be suppressed to a low level even in a combustion chamber having the shape of this embodiment.

Combustion which is mainly premixed combustion carries a risk of a sharp increase in the rate of pressure rise, however due to the fact that the piston 13 begins descending at the combustion start point and the oxygen concentration in the combustion chamber 14 is reduced by performing exhaust gas recirculation, the combustion proceeds fairly slowly, and noise or vibration are not produced.

Further, as the oxygen concentration in the combustion chamber 14 is low, the combustion temperature is low and the amount of NOx produced is also reduced. This combustion technique has been proposed by the applicant in Japanese Patent Publication Tokkai Hei 7-4287.

Figure 5:
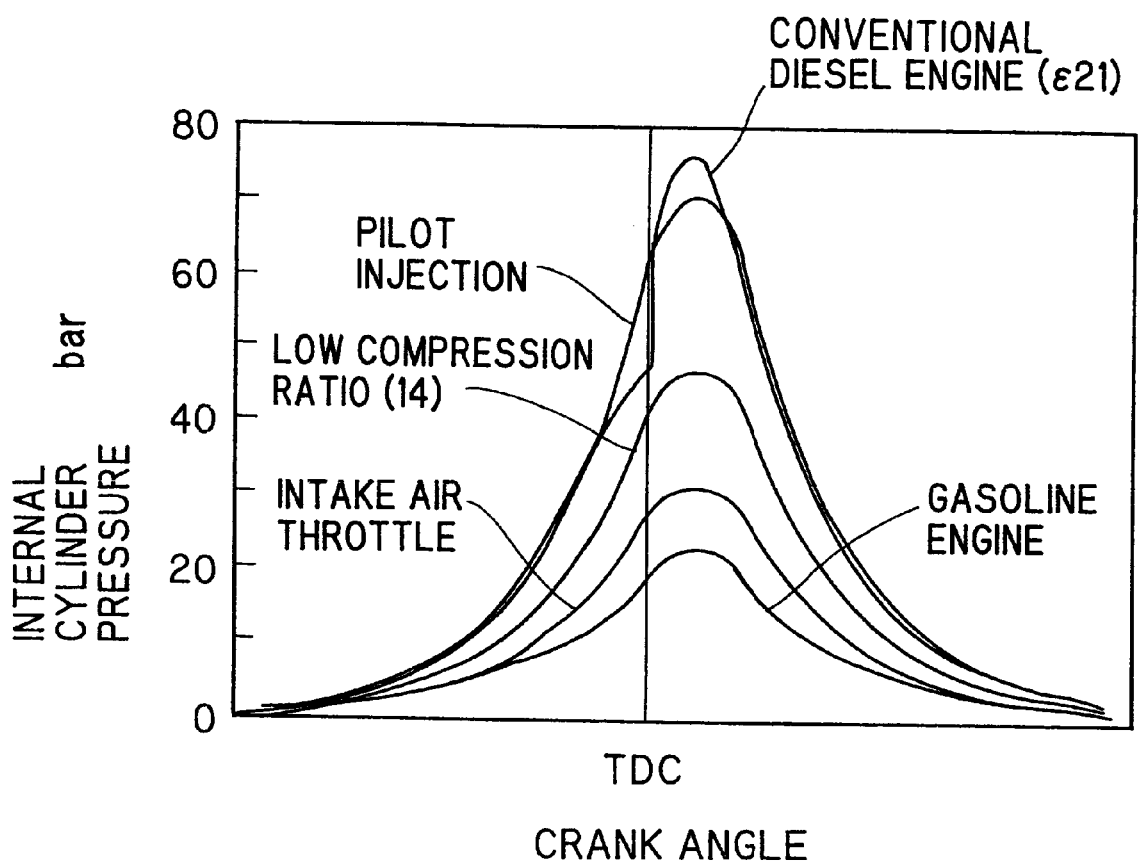
FIG. 5 is a descriptive diagram showing how an internal cylinder pressure varies according to this embodiment.

FIG. 5 compares pressure waveforms in the cylinder during the idle running state when normal combustion is performed with a compression ratio of 21 in a prior art diesel engine, when a pilot injection is performed at this compression ratio, when a pilot injection is performed and the compression ratio is reduced to 14, when the intake air is additionally throttled in the diesel engine according to this invention is used.

For comparison, the pressure waveform in an ordinary gasoline engine is also shown. Compared to 75 bar in a prior art diesel engine, the pressure is reduced to about 30 bar according to this invention which is not very different from the 20 bar of the gasoline engine.

Figure 6:
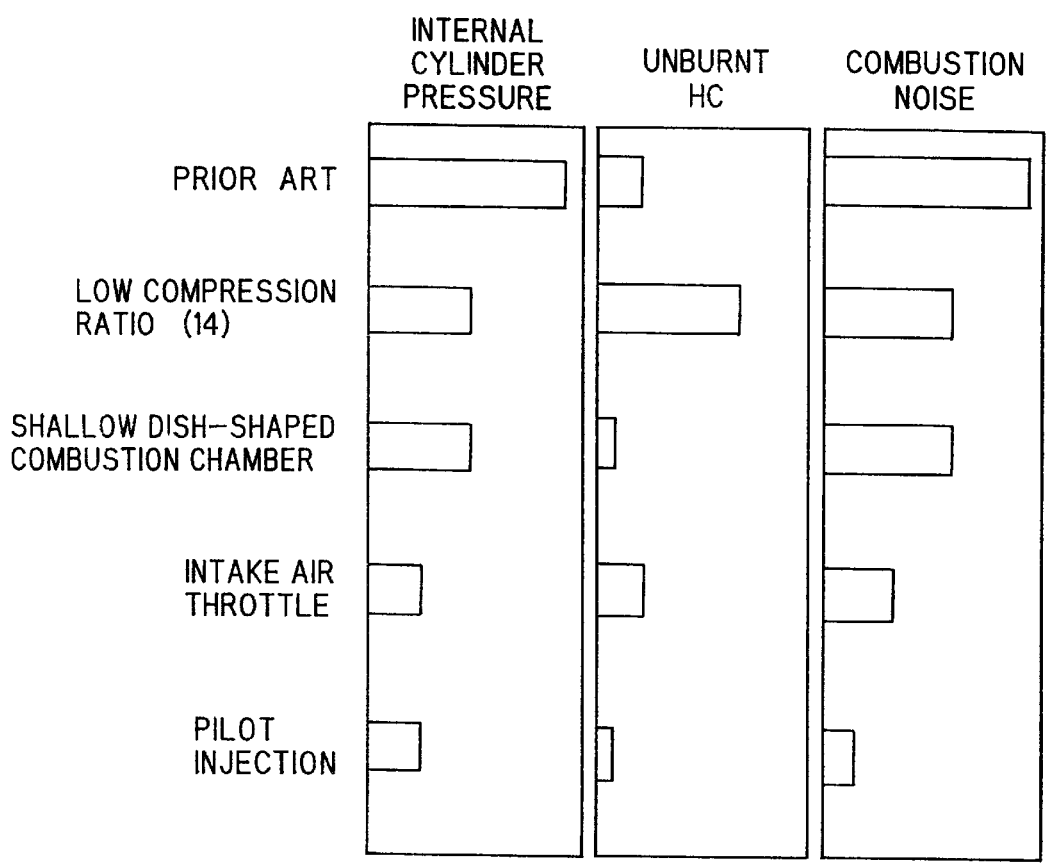
FIG. 6 is a descriptive diagram showing relations between the internal cylinder pressure, unburnt HC (Hydrocarbon) and combustion noise.
Figure 7:
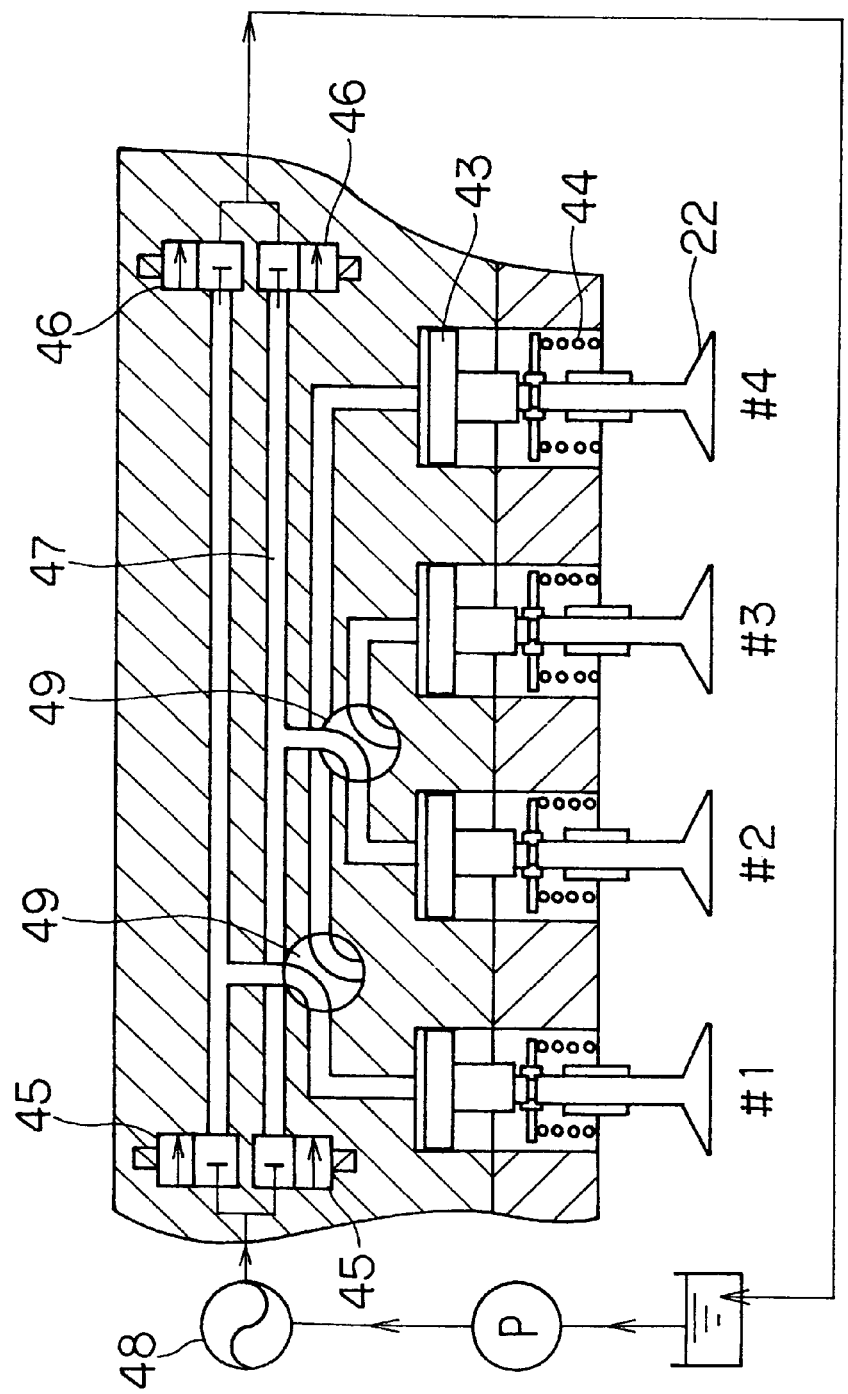
FIG. 7 is a cross-sectional view of a variable valve mechanism according to another embodiment of this invention.

FIG. 6 is a diagram comparing internal cylinder pressure, unburnt HC and combustion noise according to this invention and the prior art. It is seen that while the discharge amount of unburnt HC is suppressed to effectively the same level, combustion noise is largely reduced. It should be noted that this comparison example shows characteristics when a low compression ratio is set first, and other conditions are then added successively.

Next, a second embodiment of this invention will be described.

Here, instead of providing the throttle valve to reduce the actual compression ratio in the idle running state, a variable valve mechanism 41 is provided which can delay the close timing of the intake air valve. The close timing of the intake air valve is delayed to the vicinity of 90 degrees after intake bottom dead center. As the variable valve mechanism 41 can freely vary the operation timing of the intake air valve 22, a type is adopted which can function by oil pressure.

The intake air valve 22 in each cylinder is driven by a piston 43 disposed coaxially with it, and when the oil pressure acts on the piston 43, the intake air valve 22 is pushed down against a valve spring 44 and opens. When the oil pressure is released, the intake air valve 22 is pushed back by the valve spring 44 and closes.

In the case of a four-cylinder engine, a pair of oil pressure supply valves 45 and a pair of oil pressure discharge valves 46 are provided to control the oil pressure acting on the piston 43, and the oil pressure stored in an accumulator 48 is supplied or released via a pump to a pair of main circuits 47. From the pair of main circuits 47, oil pressure is supplied to or released from the piston 43 of each cylinder by a pair of change-over valves 49.

When the oil pressure supply valve 45 opens, a high pressure acts on the main circuit 47, the change-over valve 49 causes this high pressure to act on the piston 43 of the cylinder during the air intake stroke, and the intake air valve 22 therefore opens. After this state, when the oil pressure supply valve 45 closes and the oil pressure release valve 46 opens, the oil pressure of the main circuit 47 is released and the intake air valve 22 closes.

Figure 8:
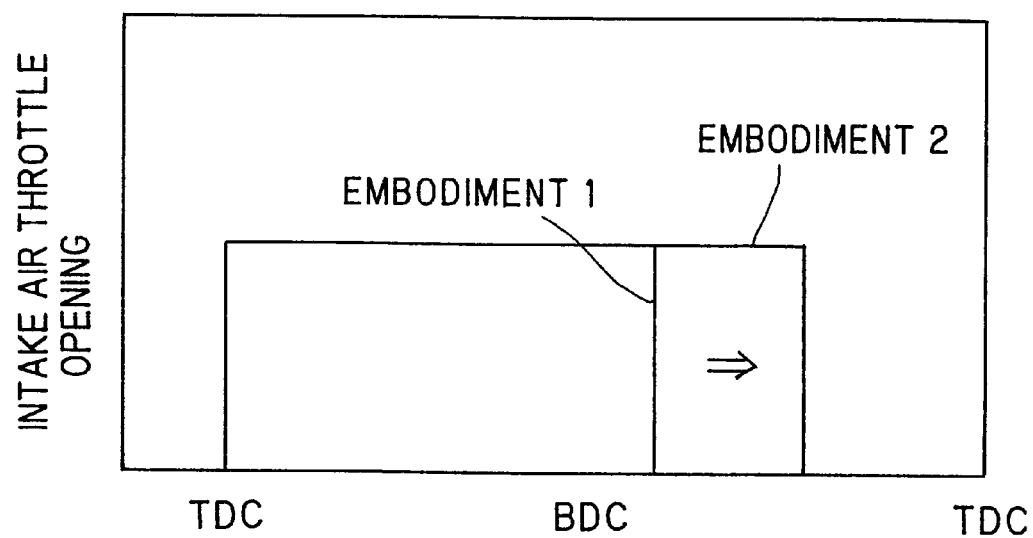
FIG. 8 is a descriptive diagram showing an open/close timing of an intake air valve.

Therefore, by controlling the operation of the oil pressure supply valve 45 and oil pressure release valve 46, the open/close timing and open/close period of the intake air valve 22 can be freely controlled. When the engine enters the idle state, the close timing of the intake air valve 22 is delayed to the vicinity of 90 degrees after intake bottom dead center, as shown in FIG. 8.

In the normal running state, the intake air valve 22 opens in the vicinity of exhaust top dead center and closes as a position slightly beyond intake bottom dead center, but this closing position may be considerably delayed.

By delaying the intake air valve close timing in this way, air which has been aspirated into the cylinder is pushed back into the intake air passage in the compression stroke, so the intake air amount is reduced, and the compression pressure and maximum internal cylinder pressure fall.

Figure 9:
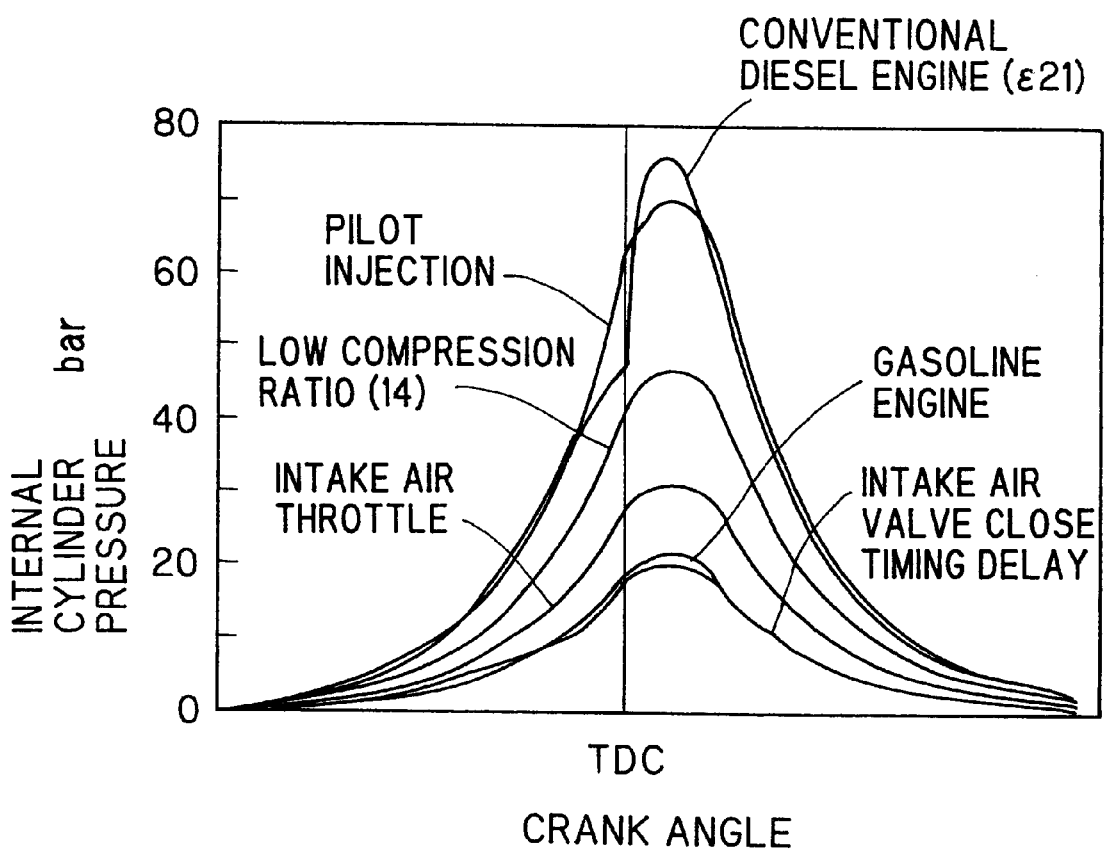
FIG. 9 is a descriptive diagram showing how the internal cylinder pressure varies.

According to this embodiment, the maximum internal cylinder pressure is reduced to the same order as that of a gasoline engine, as shown in FIG. 9. If the throttle valve is closed and the intake air amount is reduced as in the previous embodiment, pumping loss occurs as in the gasoline engine, and this leads to an impairment of fuel-cost performance. However, according to this embodiment, the intake air amount can be reduced without causing pumping loss.

According to this embodiment, as the intake air amount is reduced more than in the previous embodiment, it is even more necessary to maintain ignitability and combustion stability, and to prevent generation of unburnt HC, than in the previous embodiment.

Hence, according to this embodiment the pilot injection is performed in two stages.

Figure 10:
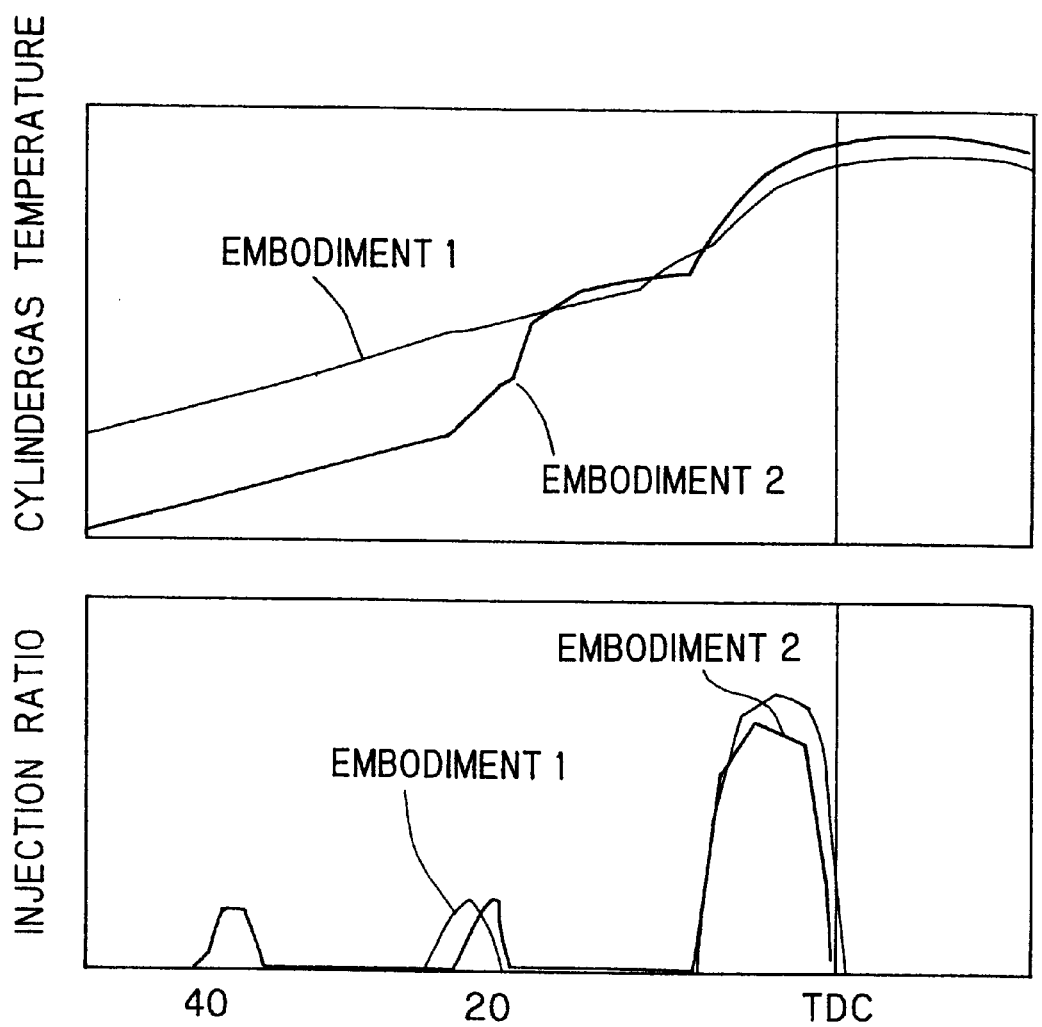
FIG. 10 is a descriptive diagram showing a fuel pilot injection timing.

Specifically, a first pilot injection is performed in the vicinity of 40 degrees before compression top dead center, and then a second pilot injection is performed in the vicinity of 20 degrees before compression top dead center, as shown in FIG. 10.

On the other hand, in running states other than the idle running state, the intake air valve close timing is set to the normal timing and only a main fuel injection is performed.

The contents of Japanese Patent Application Tokugan Hei 11-163659, with a filing date of Jun. 10, 1999 in Japan is hereby incorporated by reference.

It will be understood that this invention is not limited to the aforesaid embodiments, various modifications being possible within the scope and spirit of the appended claims.

What is claimed is:

1. A diesel engine comprising:

a piston having a dish-shaped combustion chamber is formed on its top surface, a fuel injector situated coaxially with the combustion chamber which injects fuel directly into a cylinder, an intake air amount control device which varies an intake air amount aspirated by the engine, a detector which detects a running state of the engine, and a microprocessor programmed to:

determine whether or not the engine is an idle running state or a normal running state, control the intake air amount control device based on the engine running state so that the intake air amount in the idle running state is less than the intake air amount in the normal running state, and control the fuel injector so that part of the fuel is injected before a main injection when the engine is in the idle running state.

2. A diesel engine as defined in claim 1, further comprising:

an exhaust gas recirculation control device which recycles part of the exhaust gas into the engine intake air, and wherein the microprocessor is further programmed to:

control the exhaust gas recirculation control device so that an exhaust gas amount determined according to running conditions is recirculated into the intake air when the engine is in the normal running state, and control the fuel injector so that effectively all the fuel in the main injection is injected in an ignition delay period of the main injection when the engine is in the normal running state.

3. A diesel engine as defined in claim 1, wherein the intake air amount control device comprises a throttle valve disposed in an engine intake air passage.

4. A diesel engine as defined in claim 1, wherein the intake air amount control device comprises a mechanism which variably regulates the close timing of an engine intake air valve.

5. A diesel engine as defined in claim 1, wherein the compression ratio of the engine is set to approximately 14.

6. A diesel engine comprising:

a piston having a dish-shaped combustion chamber is formed on its top surface, a fuel injector situated coaxially with the combustion chamber which injects fuel directly into a cylinder, an intake air amount control device which varies an intake air amount aspirated by the engine, a means for detecting a running state of the engine, means for determining whether or not the engine is an idle running state or a normal running state, means for controlling the intake air amount control device based on the engine running state so that the intake air amount in the idle running state is less than the intake air amount in the normal running state, and means for controlling the fuel injector so that part of the fuel is injected before a main injection when the engine is in the idle running state.

* * * * *